United States Patent [19]

Bailey

[11] Patent Number: 5,374,029
[45] Date of Patent: Dec. 20, 1994

[54] SOLENOID FLOW CONTROL VALVE AND FRICTIONLESS PLUNGER ASSEMBLY

[75] Inventor: Roderick F. Bailey, Canandaigua, N.Y.

[73] Assignee: Wright Components, Inc., Phelps, N.Y.

[21] Appl. No.: 904,574

[22] Filed: Jun. 26, 1992

[51] Int. Cl.$^5$ .................... F16K 31/06; F16K 11/044
[52] U.S. Cl. .................... 251/129.16; 251/129.21; 251/129.17; 137/613; 137/625.65
[58] Field of Search .................... 251/129.16, 129.21, 251/129.17; 137/625.65, 613

[56] References Cited

U.S. PATENT DOCUMENTS

| | | | |
|---|---|---|---|
| 3,529,620 | 9/1970 | Leiber | 137/625.65 X |
| 3,972,505 | 8/1976 | Padula | 137/625.65 X |
| 4,477,027 | 10/1984 | Knapp et al. | 251/129.21 X |
| 4,621,788 | 11/1986 | DeLew et al. | |
| 4,641,072 | 2/1987 | Cummins | |
| 4,655,249 | 4/1987 | Livet | |
| 4,682,675 | 7/1987 | Eddy, Jr. | |
| 4,691,621 | 9/1987 | Hall | |
| 4,746,094 | 5/1988 | Cummins | |
| 4,753,212 | 6/1988 | Miyaki et al. | |
| 4,765,587 | 8/1988 | Cummins | |
| 4,782,862 | 11/1988 | Nguyen | |
| 4,852,605 | 8/1989 | Grouhier | 251/129.16 X |
| 5,015,000 | 5/1991 | Perini | |
| 5,158,263 | 10/1992 | Shimizu et al. | 251/129.21 |

FOREIGN PATENT DOCUMENTS 2739085  3/1979  Germany .................. 251/129.16

OTHER PUBLICATIONS

Clippard Electronic/Pneumatic Interface Products advertisement, Hydraulics & Pneumatics, May 1988.
Computer search results obtained by EG&G Patent Counsel from NERAC pertaining to no-sliding fit valves and developments at Moog, Inc.

Primary Examiner—Arnold Rosenthal
Attorney, Agent, or Firm—Finnegan, Henderson, Farabow, Garrett & Dunner

[57] ABSTRACT

Solenoid flow control valve having a valve body with a chamber defined therein and first and second flow ports; a seat member located within the chamber and defining a mouth of the first flow port; a plunger longitudinally positionable between a first plunger position in sealing engagement with the seat member and a second plunger position spaced from the seat member; a selectively-operable electromagnetic having a core spool member with the second flow port extending therethrough; two disk springs radially extending from the plunger to the valve body; and a pole piece having a base portion affixed to the valve body and a flux receiving portion positioned between the two disk springs and radially extending toward the plunger, such that selective operation of the electromagnet moves the plunger toward the core spool member to the second plunger position to form a magnetic circuit through the plunger, the pole piece, the valve body and core spool member.

12 Claims, 6 Drawing Sheets

SOLENOID FLOW CONTROL VALVE AND FRICTIONLESS PLUNGER ASSEMBLY

BACKGROUND OF THE INVENTION

1. Field of the Invention

The present invention relates to a flow control valve. In particular, the present invention is directed to a solenoid flow control valve having a resiliently-supported plunger assembly for frictionless operation, which is capable of consistent sealing, low leakage and long cycle life.

2. Description of the Prior Art

A variety of valve configurations are available for controlling fluid flow. One such configuration utilizes a sliding-fit plunger within the chamber of a valve body. Typically, the valve body includes an inlet and outlet port, and a sealing interface against which the sliding-fit plunger is adapted to engage during operation of the flow control valve to prevent fluid flow. This sliding-fit plunger assembly is commonly utilized within conventional solenoid flow control valves.

A conventional solenoid flow control valve includes an electromagnet having a solenoid coil wrapped around an open core spool. The core spool includes a bore hole extending therethrough, the bore hole being of sufficient diameter to permit substantially uninhibited sliding movement of the plunger therein. Of course, to permit such uninhibited movement, an annular gap must be provided between the plunger and the bore hole such that the sliding-fit plunger is capable of axial, radial and rotational movement. With the plunger provided so as to slide within the bore hole of the core spool, axial movement of the plunger may then be controlled by energizing the wire coil to induce a magnetic flux through the open core spool. In this manner, the sliding-fit plunger is drawn into the bore hole, and a magnetic flux path or magnetic circuit is generally established through the sliding-fit plunger, the core spool, and the solenoid housing which substantially encloses the wire coil.

Several embodiments of a solenoid flow control valve having a sliding-fit plunger assembly include U.S. Pat. Nos. 4,621,788 issued to Delew et al.; 4,641,072 issued to Cummins; 4,655,249 issued to Livet; 4,682,675 issued Eddy, Jr.; 4,691,621 issued to Hall; 4,746,094 issued to Cummins; 4,753,212 issued to Miyaki et al.; 4,765,587 issued to Cummins; 4,782,862 issued to Nguyen; and 5,015,000 issued to Perini.

Unfortunately, the sliding-fit plunger assembly has proven to inherently limit the design, operation, and overall service life of conventional solenoid control valves. These limitations are primarily due to the free-floating movement of the plunger. For example, due to the frictional force induced between the outer wall of the plunger and the inner wall of the core spool during operation of the flow control valve, a greater magnetic force is required to drive the plunger through the bore hole. To facilitate this greater magnetic force, a larger solenoid coil and corresponding solenoid housing are typically required.

Another detrimental side effect of the sliding-fit plunger assembly is the production of wear products or particulates. These wear products are generated by the outer wall of the plunger abrasively sliding against the inner wall of the core spool. Inherently the wear products increase the relative friction between sliding surfaces of the plunger and core spool, thus further necessitating a larger solenoid coil assembly. Likewise, as the wear products progress through the flow control valve, they tend to interfere with the sealing interface of the valve so as to create leakage risks, and may eventually become lodged between moving surfaces of the valve, thus rendering the valve inoperative.

Additionally, the sliding-fit plunger's freedom of radial and rotational movement typically results in the degradation of the sealing interface. Due to the annular gap between the plunger and the bore hole, the sliding-fit plunger is not capable of consistent alignment with the sealing interface from one cycle to the next. As a result, inconsistent overlying seal impressions are created in the sealing interface, which leads to seal wear and subsequent leakage of the valve.

To reduce friction between the sliding-fit plunger and the bore hole of conventional solenoid flow control valves, lubricants are frequently required. However, due to the risk of contaminating the fluid flow which is intended to be controlled by the valve, the use of lubricant is often precluded. Of course without the desired lubricant, the operation and service life the solenoid valve are severely impaired.

Due to these limits in design, operation, and service life, it is well recognized that conventional solenoid flow control valves are inadequate for use in the pulse width modulation servocontrol field. Pulse width modulation requires the rapid high-speed continuous cycling of the flow control valve. Clearly, the inherent risks and limitations of the conventional solenoid valve, as discussed above, limit its use in the pulse width modulation field if sufficient lubricant coatings or plating are not provided on the plunger or the coil to reduce friction and galling.

SUMMARY OF THE INVENTION

The general object of the invention is to provide a valve for controlling fluid flow, which is capable of consistent sealing, low leakage and high cycle life, as well as more accurate and consistent plunger response times.

Another object of the invention is to provide a flow control valve having a frictionless plunger assembly, which is capable of controlling either liquid or gaseous fluid flow media without requiring lubrication.

A further object of the invention is to provide a flow control valve having a frictionless plunger assembly, which is compatible in the pulse width modulation servocontrol field, and is capable of controlling an extended range of fluid flow and providing greater accuracy in response times during both opening and closing functions.

Additional objects and advantages of the invention will be set forth in part in the description which follows, and in part will be obvious from the description, or may be learned by practice of the invention. The objects and advantages of the invention will be realized and obtained by means of the elements in combinations particularly pointed out in the appended claims.

To achieve the objects and in accordance with the purpose of the invention, as embodied and broadly described herein, the invention includes a flow control valve having a valve body with a chamber defined therein. The valve body has a first flow port and a second flow port, both fluidly communicating with the chamber. A seat member is located on the valve body within the chamber, the seat member defining a mouth of the first flow port. A plunger is provided within the chamber, the plunger being positionable along a longitudinal axis extending through the mouth of the first flow port. More specifically, the plunger is positionable between a first plunger position in sealing engagement with the seat member to prevent flow through the first flow port and a second plunger position spaced from the seat member to permit flow through the first flow port. The flow control valve of the present invention further includes means for supporting the plunger in alignment with the longitudinal axis as the plunger is moved between the first plunger position and the second plunger position. The supporting means is connected to and radially extends from the plunger to the valve body. The present invention also includes means for selectively positioning the plunger from the first plunger position to the second plunger position, the positioning means being independent of the supporting means.

As preferably embodied in the flow control valve of the present invention, the valve body and the plunger are made of magnetically-permeable material. The positioning means includes a pole piece made of magnetically-permeable material affixed to the valve body within the chamber proximate to and spaced from the plunger. A selectively-operable electromagnet is located along the longitudinal axis of the adjacent plunger, such that selective operation of the selectively-operable electromagnet moves the plunger toward a portion of the selectively-operable electromagnet to the second plunger position to form a magnetic circuit through the plunger, the pole piece, the valve body and the portion of the selectively-operable magnet. Likewise, the supporting means includes two disk springs radially-extending from the plunger to the valve body, with at least a portion of the pole piece positioned between the two disk springs.

It is to be understood that both the foregoing general description and the following detailed description are exemplary and explanation only and are not restrictive of the invention, as claimed.

BRIEF DESCRIPTION OF THE DRAWINGS

The accompanying drawings, which are incorporated in and constitute a part of this specification, illustrate various embodiments of the invention, and together with the description, serve to explain the principles of the invention.

DESCRIPTION OF THE PREFERRED EMBODIMENTS

A. The Apparatus

Reference will now be made in detail to the presently preferred embodiment of the invention, an example of which is illustrated in the accompanying drawings. Wherever possible, the same reference numbers will be used throughout the drawings to refer to the same or like parts.

The function of a flow control valve is to control the flow of a fluid media through corresponding system piping. In accordance with the present invention, the flow control valve of the present invention is capable of controlling either liquid or gaseous media, particularly where quick response, long life, and dynamic stability are essential. The flow control valve made in accordance with the present invention includes a valve body having a chamber defined therein. The valve body of the present invention includes a first flow port and a second flow port; both the first flow port and the second flow port fluidly communicating with the chamber.

Figure 1:
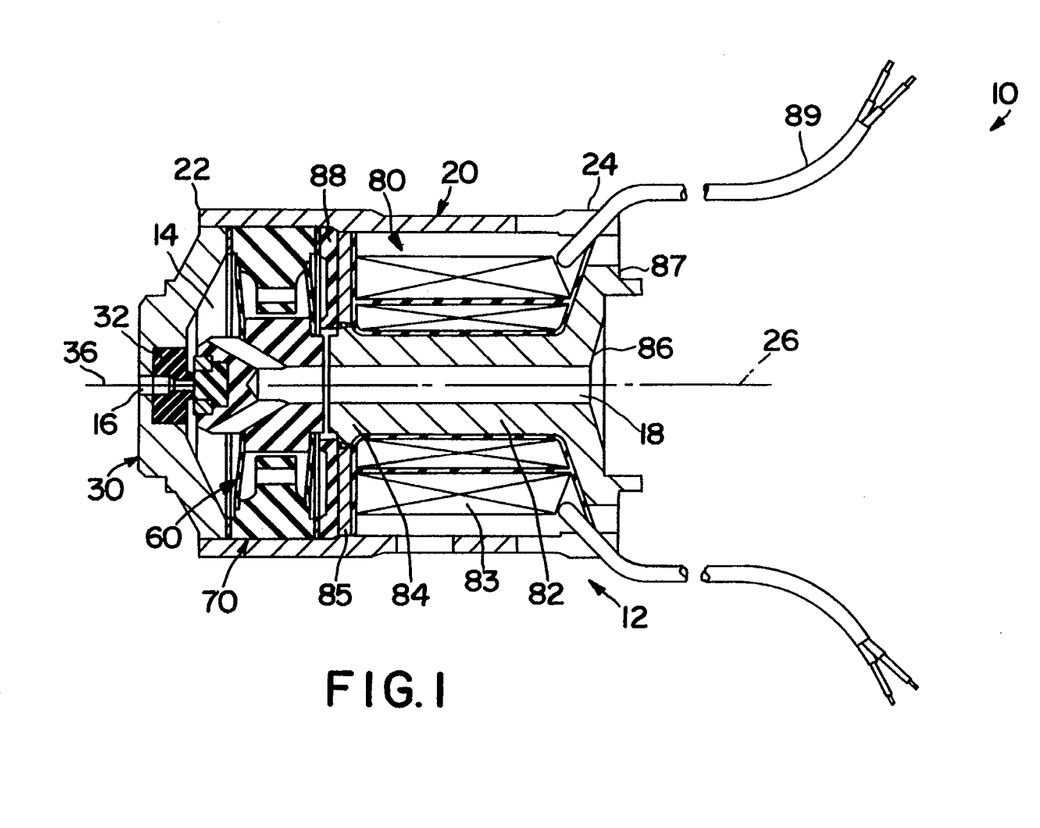
FIG. 1 is a schematic cross-sectional side view of a representative embodiment of the flow control valve of the present invention.

With initial reference to FIG. 1, the flow control valve, as generally designated by reference character 10, essentially comprises a hollow valve body 12 which substantially encapsulates the operative components of the present invention. As embodied herein, the valve body 12 includes a longitudinally-extending tubular member 20 generally defined by first end 22, a second end 24, and a longitudinally-extending center axis 26. Preferably, the tubular member 20 is generally cylindrical in shape. Further, it is preferred that the tubular member 20 be light weight, yet durable, so as to withstand anticipated vibrational forces. Generally, and as determined through extensive evaluation, weight reduction may best be facilitated by reducing the outer diameter of the tubular member 20 to minimize the corresponding wall thickness, and by reducing the overall length of the tubular member 20.

An end cap 30 is secured to the first end 22 of the tubular men%her 20 in a sealing manner. As seen in FIG. 1, the end cap 30 includes the first flow port 16 extending therethrough. In the preferred embodiment, the first flow port 16 is axially aligned with the center axis 26 of the tubular member 20. The second end 24 of the tubular member 20 is also enclosed in a sealing manner. As will be discussed in greater detail below, a core spool member 82 is provided in sealing engagement with the second end 24 of the tubular member 20 such that the chamber 14 is substantially defined by the tubular member 20, the end cap 30 and the core spool member 82. Further, the core spool member 82 preferably includes the second flow port 18 extending therethrough. In the preferred embodiment, the second flow port 18 is also axially aligned with the center axis 26 of the tubular member 20.

The flow control valve of the present invention may be installed in a fluid piping system either with the first flow port operating as the inlet to the valve body, or with the second flow port 18 operating as the inlet. For exemplary purpose only, the preferred embodiment of flow control valve 10 presented hereinafter reflects the second flow port 18 being utilized as the valve inlet, with the first flow port 16 operating as the valve outlet.

Further in accordance with the present invention, a seat member is located on the valve body within the chamber, such that the seat member defines a mouth of the first flow port. As seen in FIG. 1, the seat member 32 is formed on the end cap 30 to define at least a portion of the first flow port 16. More specifically, the seat member 32 defines the mouth 34 of the first flow port 16 with the longitudinal axis 36 extending therethrough. Preferably, the longitudinal axis 36 is axially aligned with the center axis 26 of the tubular member 20. As evident in FIGS. 2A and 2B, the seat member 32 includes a lip extension 33 which extends inwardly into the chamber 14 to define the peripheral edge of the mouth 34.

Figure 2A:
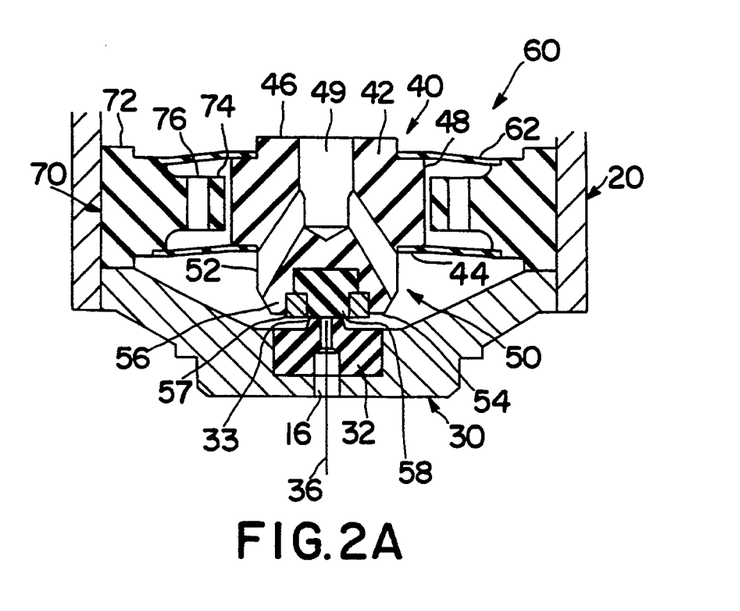
FIG. 2A is an enlarged cross-sectional side view of the plunger biased to the first plunger position to prevent fluid flow.
Figure 2B:
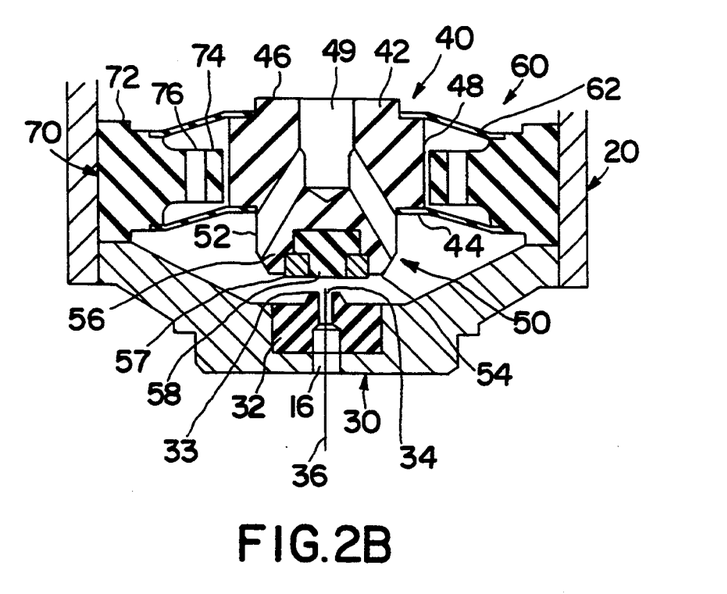
FIG. 2B is an enlarged cross-sectional side view of the plunger moved to the second plunger position to permit fluid flow.

As seen in FIGS. 1, 2A and 2B, the seat member may be provided as a separate piece which is adapted to be attached to the end cap 30. Although a variety of materials may be utilized for forming the seat member 32 as a separate piece, it is preferable to utilize tetrafluoroethylene (Teflon) for very low seat leakage characteristics. Due to its durability, both wear products and seal impressions are minimized by the Teflon construction. Further, since Teflon is compatible with numerous very corrosive fluids, the use of this material enables the valve of the present invention to be utilized with a greater variety of fluid media. Of course, it should be understood that in an alternative embodiment, the seat member 32 and the end cap 30 may be integrally formed as a single piece. For example, the end cap 30 itself may be machined from steel stock or the like to include the mouth-defining lip extension 33.

In accordance with the present invention, a plunger is provided within the chamber of the valve body. The plunger is positionable along the longitudinal axis which extends through the mouth of the first flow port. In this manner, the plunger is positionable between a first plunger position in sealing engagement with the seat member, and a second plunger position spaced from the seat member. The first and second plunger positions are best demonstrated by FIGS. 2A and 2B, respectively. It should be understood that when in the first plunger position, the plunger 40 prevents flow through the first flow port 16. Likewise, when the plunger 40 is in the second plunger position, fluid flow is permitted through the first flow port 16.

As seen in FIGS. 1, 2A and 2B, and as embodied herein, the plunger 40 of the present invention is substantially a solid member 42 having a first surface 44 for sealing engagement with the seat member 32. More specifically, the first surface 44 is adapted to abut against the lip extension 33 of the seat member 32 when the plunger 40 is in the first plunger position. In this manner, the mouth 34 of the first flow port 16 is obstructed to prevent the flow of fluid therethrough. Opposite the first surface 44, the plunger 40 includes a second surface 46. A peripheral side surface 48 extends between the first surface 44 and the second surface 46 of the plunger 40.

In the preferred embodiment of the present invention, the first surface 44 of the plunger 40 is defined by an extension 50 having a side wall 52 and a sealing surface 54. Further included within the sealing surface 54 of the first surface extension 50 of the preferred embodiment of the plunger 40 is a retaining cavity 56. The retaining cavity 56 is adapted to hold a seal member insert 58. In the preferred embodiment, a retainer ring 57 is provided for securing the seal member insert 58 within the retaining cavity 56, and the seal member insert 58 is positioned for sealing engagement with the seat member 32 when the plunger 40 is moved to the first position. Preferably, the seal member insert 58 is made of Teflon for very low seat leakage characteristics, and, if desired, the seal member insert 58 may be detachable from the retaining cavity 56 for easy replacement to prevent excessive wearing and to extend the life of the plunger 40.

As will be discussed in greater detail below, the plunger 40 also includes a through port 49 extending from its second surface 46 to the side wall 52 of the first surface extension 50. See FIGS. 1, 2A, 2B and 3. This through port 49 prevents the build-up of excessive back pressure on the second surface 46 when the plunger 40 is in the first plunger position, and facilitates the flow of fluid through the control valve when the plunger 40 is moved to the second plunger position.

To maintain alignment with the longitudinal axis, means are provided for supporting the plunger as the plunger is moved between the first plunger position and the second plunger position. In accordance with the present invention, the supporting means is connected to and radially extends from the plunger to the valve body. As embodied herein, the supporting means is provided by connecting a spring assembly 60 to the plunger 40. See FIGS. 1, 2A, 2B and 4. The spring assembly 60 resiliently supports the plunger 40 within the chamber 14 in alignment with the longitudinal axis 36, as well as provides a frictionless guide for longitudinal positioning of the plunger 40. Likewise, the spring assembly 60 provides both high radial stiffness and rotational rigidity to ensure consistent sealing alignment between the first surface 44 of the plunger 40 and the seat member 32, as discussed below.

Figure 3:
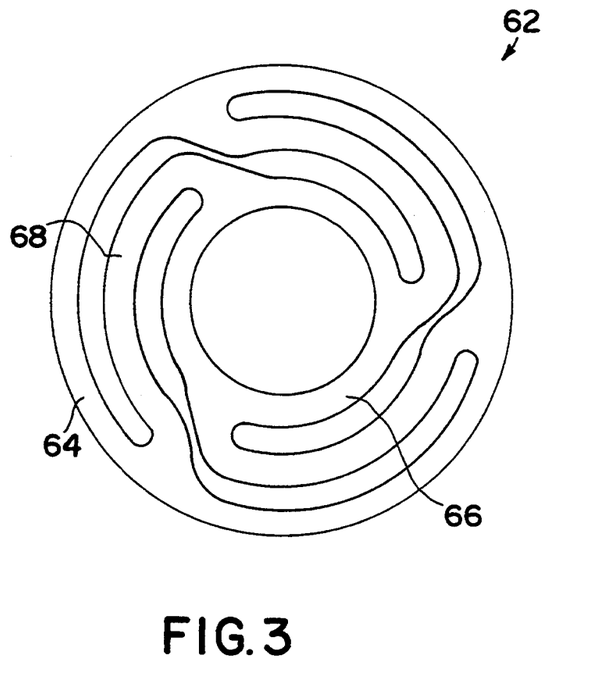
FIG. 3 is a front view of one embodiment of the disk spring of the present invention.

Preferably, the spring assembly 60 of the present invention includes a disk spring configuration. While it is envisioned that a single disk spring 62 may be utilized to support and align the plunger 40 within the chamber 14, it is preferred that at least two spaced-apart disk springs 62 be utilized. FIG. 3 shows a front view of a preferred embodiment of one disk spring 62 of the present invention. Generally, each disk spring 62 of the preferred embodiment includes an outer peripheral member 64, an inner cuff member 66 and a plurality of "S-shaped" resilient members 68 extending therebetween, as seen in FIG. 3. Further, and as will be discussed below, it is preferred that at least one disk spring 62 is preloaded to bias the plunger 40 toward the seat member 32 into the first plunger position.

The outer peripheral member 64 may be attached directly to the inner wall of the tubular member 20, or to an intermediate member positioned therebetween, as will be discussed further, below. Likewise, the plunger 40 is attached to and supported within the cuff member 66 of each disk spring 62. While a variety of means may be utilized for attaching each disk spring 62 to the plunger 40 and the valve body 12, it is preferable to utilize electron beam welding or similar secure attaching means. The S-shaped members extending between the outer peripheral member 64 and the cuff member 66 of each disk spring 62 enhance the resiliency of the disk spring 62, as well as provide the plunger 40 with both rotational and radial stability.

Various methods within the knowledge and understanding of one of ordinary skill in the art may be utilized in manufacturing the disk spring 62 of the present invention. In the preferred embodiment, the disk spring 62 is etched from a flat sheet stock of corrosive resistant spring material to prevent residual stress typically related to other manufacturing processes. Stainless steel is utilized to take advantage of its corrosion resistant characteristics, thus ensuring the long life and durability of the flow control valve. Typically, the flat sheet stock will have a thickness between about 1/100 and 1/20 of an inch, although the precise thickness will depend upon the design capacity of the flow control valve.

As previously mentioned, it is preferred that at least two spaced-apart disk springs 62 be utilized for supporting and aligning the plunger 40 within the chamber 14 of the valve body 12. As best seen in FIGS. 2A and 2B, the two spaced apart disk springs 62 substantially provide a "guiding four bar linkage system" for stable, precision movement of the plunger 40 along the longitudinal axis 36. That is, the two spaced-apart disk springs 62 apply a substantially-uniform radial force along opposite ends of the plunger 40, so as to continually maintain both the first surface 44 and the second surface 46 of the plunger 40 in substantially perpendicular alignment with the longitudinal axis 36. Thus, a four bar linkage effect is created, such that the plunger 40 is free to travel along the longitudinal axis 36 while rotational and radial movement of the plunger 40 is prohibited.

To assemble the four bar linkage system of the two spaced part disk springs 62, it is preferred that a first disk spring 62 is attached to the plunger 40 proximate the first surface 44 of the plunger 40, while a second disk spring 62 is attached proximate the second surface 46 of the plunger 40. As previously mentioned, the disk springs 62 are preferably attached to the plunger 40 by welding or the like; however, clamping, fasteners or "snap-fit-type" connections may likewise prove sufficient. It is noted that FIGS. 1, 2A and 2B show the first surface extension 50 of the plunger 40 extending beyond the location at which the first disk spring 62 is attached to the plunger 40. In this manner, the through port 49 extending through the plunger 40 opens to the chamber 14 between the first disk spring 62 and the sealing surface 54 of the first surface extension 50.

FIGS. 2A and 2B schematically present the operation of the flow control valve 10 having two spaced-apart disk springs 62. FIG. 2A shows the plunger 40 in the first plunger position with the first surface 44 of the plunger 40 in abutting and sealing engagement with the seat member 32. As previously mentioned, it is preferred that at least one of the disk springs 62 is preloaded to bias the plunger 40 toward the seat member 32 into the first plunger position to prevent fluid flow through the first flow port 16; i.e., valve-closed safety position. In the preferred embodiment, both disk springs are preloaded. FIG. 2B shows the plunger 40 in the second plunger position with the flow control valve 10 opened. It is evident that the force required to open the valve must be sufficient to overcome the biasing force of the preloaded disk spring 62. Further evident from FIGS. 2A and 2B, is the lack of any sliding or frictional surfaces between the plunger 40 and any internal surface of the valve body 12. Thus, frictional forces and the resulting detrimental effects of wear products are eliminated.

Means are also provided for selectively positioning the plunger from the first plunger position to the second plunger position. In accordance with the present invention, this positioning means is independent of the supporting means. More specifically, and as embodied herein, the present invention relates to a solenoid-type flow control valve 10. The positioning means includes a selectively-operable magnet 80 located along the longitudinal axis 36 adjacent the plunger 40, such that selective operation of the selectively-operable magnet 80 moves the plunger 40 toward a predetermined portion of the selectively-operable magnet 80 to the second plunger position.

It is presently preferred that an electromagnet 80 be utilized as the positioning means, although it is envisioned that alternate embodiments of a selectively-operable magnet either are or may become available due to the anticipated future advancements in the art. The selectively-operable electromagnet 80 of the present invention includes a magnetically-permeable core spool member 82 encircled by a solenoid coil assembly 83. A variety of solenoid coil assemblies are known to be conventional in the art; however, the preferred embodiment utilizes a dual copper wire coil configuration to enhance reliability in the event one of the wire coils should later prove inoperable. Inherently, when a current is applied through the wire coil assembly 83, an electromagnetic force is generated. Of course, in order to utilize an electromagnet 80 as the positioning means, the flow control valve of the present invention must be capable of sustaining a closed magnetic circuit or flux path.

Figure 4:
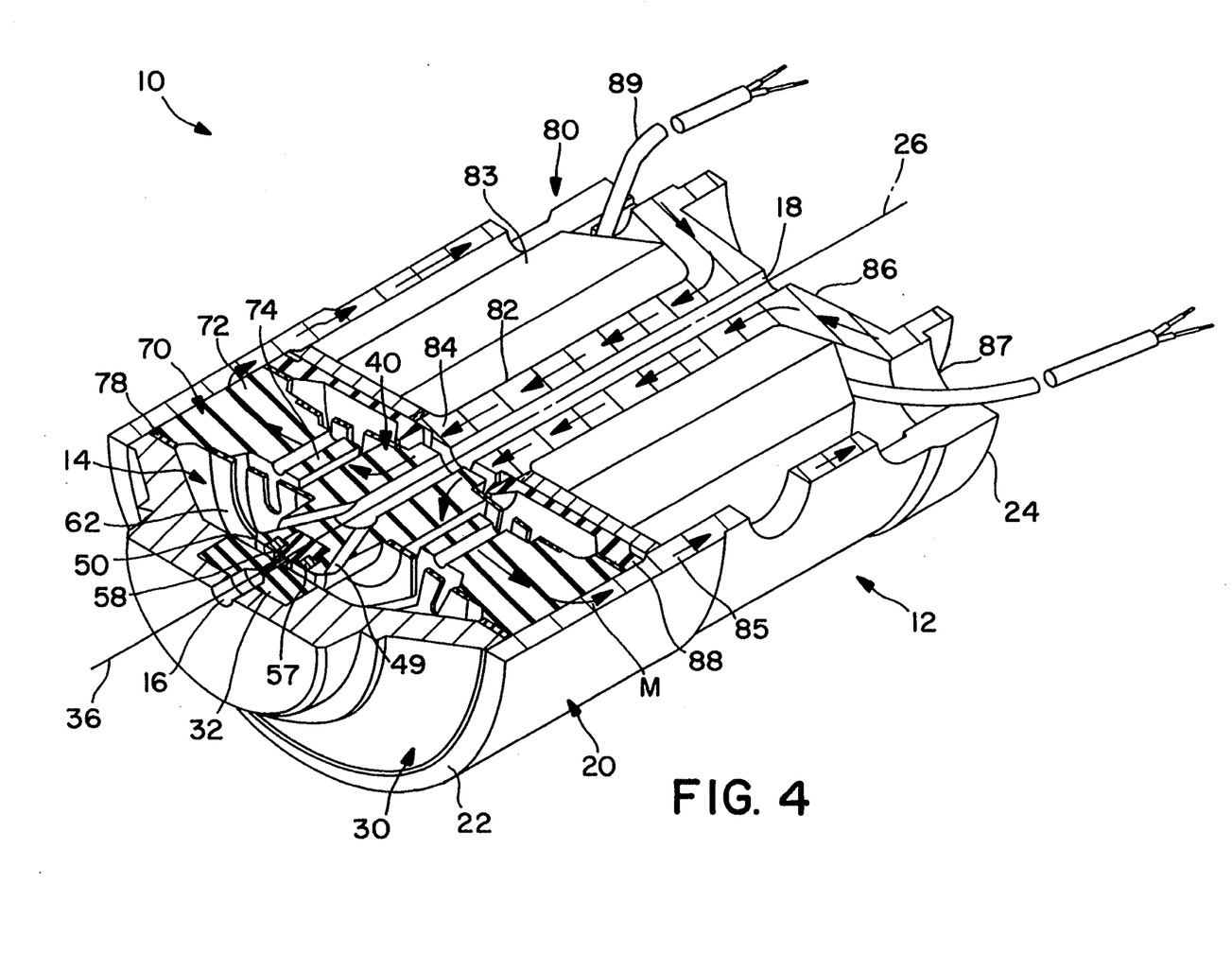
FIG. 4 is a cross-sectional orthogonal view of the flow control valve schematically showing the magnetic circuit.

In part, this magnetic circuit is provided by manufacturing the plunger 40 and the valve body 12 from magnetically-permeable material. To close the magnetic circuit, and further in accordance with the present invention, the positioning means includes a pole piece 70 made of magnetically-permeable material affixed to the valve body 12 within the chamber 14 proximate to and spaced from the plunger 40. In this manner, and as best seen in FIG. 4, the magnetic flux, generally designated by the reference character M, is carried through the plunger 40, the pole piece 70, the valve body 12, and the core spool member 82 when the electromagnet 80 is energized. The current for energizing the electromagnet 80 is provided to the solenoid coil assembly 83 through convention power supply means 89, as seen in FIGS. 1 and 4.

As embodied herein, the pole piece 70 is positioned adjacent the spring assembly 60 which is used for supporting the plunger 40. In particular, and as provided in the preferred embodiment of the present invention, the pole piece 70 is positioned between the two spaced-apart disk springs 62 which comprise the spring assembly 60. In this manner, the exposed surface area of the pole piece 70 which is proximate the peripheral side surface 48 of the plunger 40 may be sized for the optimum magnetic flux density without adversely affecting the longitudinal resiliency or rotational and radial stability of the plunger 40, as provided by the two disk springs 62.

In the preferred embodiment, the pole piece 70 includes a base portion 72 for affixing the pole piece 70 to the valve body 12, and a flux-receiving portion 74 extending radially toward the plunger 40. As best seen in FIGS. 1, 2A and 2B, the two disk springs 62 are preferably attached to the base portion 72 of the pole piece 70 with the flux-receiving portion 74 of the pole piece 70 positioned therebetween. Again, the two disk springs 62 may be attached to the pole piece 70 by welding, clamping, fasteners, or a "snap-fit" connection, if desired.

It is further preferred that the pole piece 70 be configured to substantially surround the peripheral side surface 48 of the plunger 40 so as to optimize the magnetic flux density. In this manner, the capacity of the flow control valve of the present invention is not limited by magnetic saturation of the pole piece. That is, the resiliency of the disk springs 62 are maintained while a pole piece 70 of larger thickness may be utilized to reduce the flux density to a level consistent with the flux carrying capability of the magnetically-permeable material selected. Thus, the range of capacity in which the flow control valve is capable of accommodating may be greatly enhanced.

Preferably, the flux-receiving portion 74 includes openings 76 extending therethrough, such that back pressure against the second surface 46 of the plunger 40 may be minimized when the plunger 40 is in the first plunger position. That is, and in addition to the through port 49 provided in the plunger 40, fluid flow may pass between the S-shaped resilient members 68 of the disk springs 62 and through the openings 76 provided in the pole piece 70 to fill the chamber 14 and eliminate excessive back pressure when the plunger 40 is in the first plunger position.

As seen in FIG. 1, the selectively-operable electromagnet 80 is substantially positioned within the second end 24 of the tubular member 20. Preferably, the magnetically-permeable core spool member 82 of the selectively-operable electromagnet 80 is axially aligned with the center axis 26 of the tubular member 20 and the longitudinal axis 36 extending through the mouth 34 of the first flow port 16. The core spool member 82 includes a first end 84 and a second end 86. The first end 84 of the core spool member 82 is positioned adjacent the second surface 46 of the plunger 40. The core spool member 82 includes a support member 85 made of magnetically-nonpermeable material extending radially from the first end 84 and adapted for sealing engagement with the valve body 12. In this manner, the chamber 14 within the valve body 12 is defined by the end cap 30, the inner wall of the tubular member 20, and the magnetically-nonpermeable support member 85.

Further, by manufacturing the support member 85 from magnetically-nonpermeable material, the magnetic flux path M is substantially forced through the plunger 40 and the pole piece 70, rather than allowing the magnetic flux path M to pass through the support member 85. That is, the magnetically-nonpermeable support member 85 prevents "short circuiting" of the selectively-operable electromagnet 80 and ensures proper operation of the solenoid flow control valve 10.

In the preferred embodiment of the present invention, the second flow port 18 extends longitudinally through the core spool member 82 of the selectively-operable electromagnet 80. As seen in FIGS. 1 and 4, the second flow port 18 is thereby axially aligned with the through port 49 which extends through the plunger 40. This enables unobstructed fluid flow through the flow control valve 10 of the present invention when the plunger 40 is in the second plunger position. Further, a flange 87 of magnetically-permeable material preferably integrally extends from the second end 86 of the core spool member 82 for attaching the core spool member 82 to the second end 24 of the tubular member 20 and for maintaining the axial alignment of the core spool member 82.

Preferably, a spacer member 88 made of magnetically-nonpermeable material is located between the plunger 40 and the first end 84 of the core spool member 82. See FIGS. 1 and 4. The spacer member 88 precludes direct contact between the second surface 46 of the plunger 40 and the first end 84 of the core spool member 82 as the plunger 40 moves toward the core spool member 82 when the selectively-operable electromagnet 80 is energized. In this manner, the plunger 40 will not be held in the second plunger position after the selectively-operable electromagnet 80 is de-energized due to the residual flux in the electromagnet from the first end 84 of the core spool member 82. Similarly, additional shims 78 made of magnetically-nonpermeable material may also be provided for a precision positioning of the pole piece 70 between the end cap 30 and the magnetically-nonpermeable support member 85.

The flow control valve of the present invention will be further clarified by the following example, which is intended to be purely exemplary of the invention. Any reasonable combination of dimensions or materials may be used in the design of the flow control valve. It should be noted, however, that it is anticipated that the flow control valve of the present invention will typically be custom designed to specifically satisfy the unique fluid flow requirements, electrical demands and environmental conditions of the system in which the valve's application is intended.

One exemplary embodiment of the solenoid flow control valve which resembles that of FIG. 1 was developed for use in a bipropellant thruster system for controlling monomethyl hydrazine and nitrogen tetroxide media with a normal operating pressure between about 20 and 300 psi, and a maximum operating pressure of about 400 psi. The design flow rate for the flow control valve was about 0.01 lb/sec $H_2O$ at 20 psid max. and 70° F. However, the flow control valve was required to operate at temperatures between about 0° F. and 250° F., while exposures as low as about −65° F. were anticipated.

Referring now to FIG. 1, the overall length of the tubular member 20 for the flow control valve designed for the above-described system is about 1.25 in.; the overall length of the core spool member 82 is about 1.0 in.; the overall length of the plunger 40 including the first surface extension 50 is about 0.4 in.; the approximate thickness of each disk spring is about 0.01 in. and the overall length of the base portion 72 of pole piece 70 is about 0.25 in., while that of the flux-receiving portion 74 is about 0.15 in. The inner diameter of the tubular member 20 ranges between about 1.1 in. at the first end 22 and 1.0 in. at the second end 24; the outer diameter of the plunger 40 is about 0.5 in.; the inner diameter of the main portion of the through port 49 is about 0.13 in.; the inner diameter of the mouth of the first flow port 16 is about 0.03 in.; and the inner diameter of the second flow port 18 is about 0.13 in.

The materials of construction of the exemplary embodiment of the flow control are as follows. The magnetically-permeable tubular member 20 is manufactured from 430 CRES; the magnetically-permeable core spool member 82 is manufactured from 430 CRES; the magnetically-nonpermeable end cap 30 is manufactured from 304L CRES; the magnetically-permeable plunger 40 is manufactured from 430 CRES; the seal member insert 58 is manufactured from Teflon; the disk springs 62 are manufactured from 17-7PH CRES; the magnetically-permeable pole piece 70 is manufactured from 430 CRES; the magnetically-nonpermeable support member 85 is manufactured from 321 CRES; and the magnetically-nonpermeable spacer member 88 is manufactured from 316L CRES. With the dimensions and materials of construction as discussed, the exemplary embodiment of the flow control valve had an overall weight of approximately 0.7 lbs.

Operationally, the exemplary embodiment of the flow control valve for the above-described system is capable of less than ten (10) millisecond response for opening and closing, regardless of the operating condition. To ensure proper closure of the flow control valve during high-vibration conditions, the disk springs are provided with a preload of about 0.8 lbs. Accordingly, the electrical requirements for the dual copper wire coil assembly is between about 22 and 35 VDC. It should be noted that while the design life for this exemplary embodiment of the flow control valve is about one million cycles, the actual operating life of existing prototypes of similar construction have proven to exceed 150 million cycles.

Of course, numerous modifications of the present invention are anticipated. For example, and in accordance with another aspect of the present invention, a replacement device for flow control valves comprises the spring assembly 60 and the pole piece 70 discussed in detail above. The replacement device is best envisioned by FIGS. 2A and 2B. Generally, the spring assembly 60 is adapted to be connected to and radially extend from the plunger 40 to the valve body 12 for supporting the plunger 40 in alignment with the longitudinal axis 36 as the plunger 40 is moved between the first plunger position and the second plunger position. Likewise, the pole piece 70 is made of magnetically-permeable material and is adapted for attachment to the valve body 12 within the chamber 14 proximate to and spaced from the plunger 40, at least a portion of the pole piece 70 adapted to be positioned adjacent the spring assembly 60, such that selective operation of the electromagnet 80 moves the plunger 40 toward the core spool member 82 to the second plunger position to form a magnetic circuit with the plunger 40, the pole piece 70, the valve body 12 and the core spool member 82. In this manner, the end cap 30 of a flow control valve may be removed, and the existing plunger 40 assembly replaced with the device of the present invention. This would simplify repair of the flow control valve, and enable modification of the flow control valve to vary flow capacity.

Figure 5:
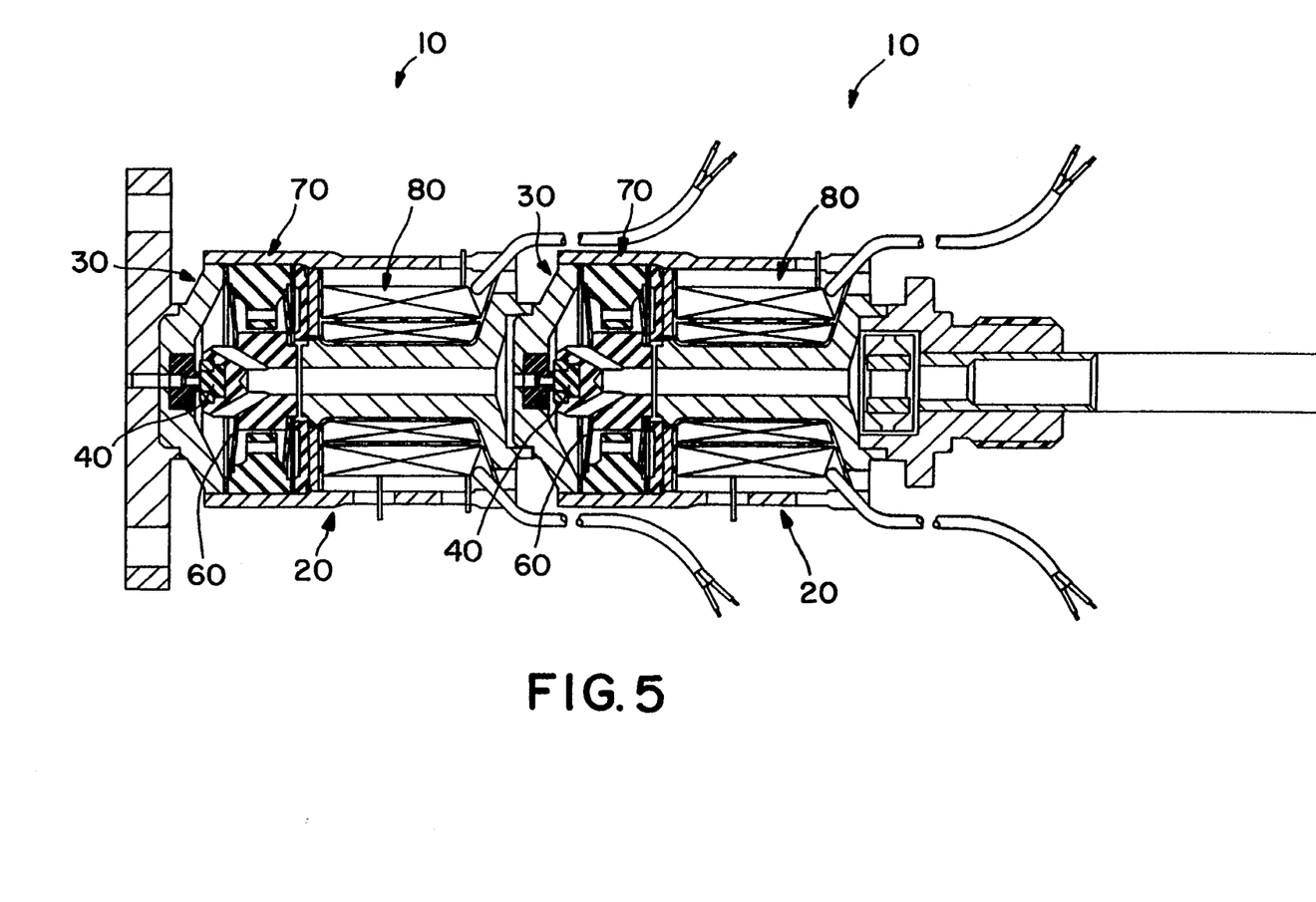
FIG. 5 is a schematic cross-sectional side view of two of the flow control valves of the present invention connected in series.

It is also anticipated that the flow control valve of the present invention may be utilized in series with similar flow control valves to enhance performance, reliability and safety. One such example of the series operation of the flow control valves 10 is shown in FIG. 5.

Figure 6:
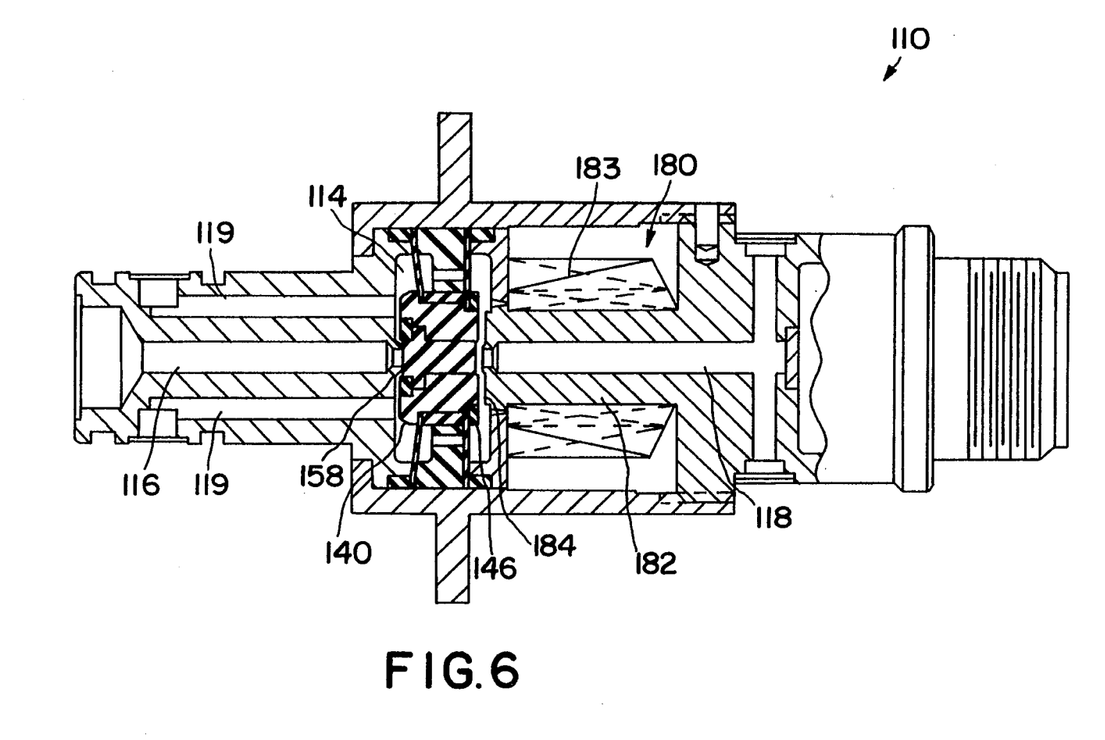
FIG. 6 is a schematic cross-section side view of an alternate representative embodiment of the flow control valve of the present invention having three-way passage.

Another anticipated modification of the flow control valve of the present invention includes providing a third flow port independent of the first and second flow ports and fluidly communicating with the chamber to permit three-way passage of a fluid media for three-way valve operation. As seen in FIG. 6, and further embodied herein, the third flow port 119 of the modified three-way valve 110 is best defined by a plurality of flow ports extending parallel to the first flow port 116 and fluidly communicating with the chamber 114. Generally, it is anticipated that the modified three-way valve 110 would be utilized such that the first flow port 116 operates as the valve inlet and the second flow port 118 operates as a vent return, while the third flow port 119 operates as the outlet.

With the wire coil assembly 183 of the selectively-operable magnet 180 de-energized, the plunger 140 is biased into the first plunger position so as to the engage the seat member 132. In this manner, fluid media is prevented from entering the valve, while any fluid media remaining in the chamber 114 exits either through the third flow port 119 or is exhausted through the second flow port 118. This three-way valve arrangement may be utilized for pulse width modulation of a pneumatic system to rapidly cycle the third flow port 119 between atmosphere and a pressurized load.

Upon energizing the wire coil assembly 183, the plunger 140 is drawn toward the first end 184 of the core spool member 182 and into the second plunger position with the plunger 140 spaced from the seat member 132. Unlike the first embodiment of the flow control valve of the present invention, and as seen in FIG. 6, no spacer member is provided between the second surface 146 of the plunger 140 and the first end 184 of the core spool member 182. Rather, the seal member insert 158 extends axially through the plunger 140 to provide a second sealing surface 154. The second sealing surface 154 is adapted for sealing engagement with the first end 184 of the core spool member 182 to prevent fluid flow through the second flow port 118. In this manner, fluid media which is permitted to enter the chamber 114 through the first flow port 116 of the control valve is then directed through the control ports until the solenoid coil assembly 183 is de-energized and the plunger 140 returns to the first plunger position.

B. Use and Operation

With the structure of the flow control valve, as set forth above, the use and operation of the flow control valve of the present invention may now be understood. Due to its unique design, the flow control valve of the present invention is suited for both liquid and gaseous media, particularly in applications where high response, long life, and dynamic stability is essential. It is anticipated that the applications of the flow control valve may include fuel, gas, and other hydraulic fluid media. In discussing the operation of the flow control valve of the present invention, reference will be made to the preferred embodiment of FIGS. 1, 2A, 2B, 3 and 4; however, the operation of alternate embodiments of the present invention will be recognized by one of ordinary skill in the art as being substantially similar.

Preferably, the flow control valve of the present invention is installed in the selected fluid piping system with the second flow port utilized as the valve inlet and the first flow port as the valve outlet. The discussion of the operation of the flow control valve of the present invention will be directed accordingly. Of course, it should be understood that the flow control valve may alternatively be installed in a fluid piping system such that the first flow port operates as the inlet to the valve body.

With the solenoid coils de-energized, the preload of the disk springs 62 biases the plunger 40 toward the first plunger position such that the seal member insert 58 retained within the first surface extension 50 of the plunger 40 engages the lip extension 33 of the seat member 32 in an abutting and sealing manner. Initially, fluid flow enters the valve body 12 through the second flow port 18, which extends through the core spool member 82 of the selectively-operable magnet 80 assembly. Upon entering the chamber 14, as defined by the end cap 30 and the magnetically-nonpermeable support member 85, the fluid flow may then travel either through the through port 49 of the plunger 40, or pass between the resilient S-shaped members of the disk springs 62 and then through the openings 76 in the pole piece 70 or between the plunger 40 and the pole piece 70. In this manner, the entire chamber 14 is capable of being filled with the fluid media. Of course, upon filling the chamber 14, the fluid flow is then precluded from passing through the first flow port 16 due the plunger 40 being in sealing engagement with the seat member 32.

To permit the fluid flow through the first flow port 16, a current is selectively applied through the power supply means 89 to the wire coil assembly 83 of the selectively operable magnet 80. Energizing the solenoid coil assembly 83 inherently generates a magnetic flux M through the core spool member 82 toward the plunger 40, as best seen in FIG. 4. The electromagnetic force associated with the magnetic flux M draws the magnetically-permeable plunger 40 toward the first end 84 of the core spool member 82. In this manner, the seal member insert 58 lifts off the seat member 32 as the plunger 40 moves to the second plunger position to permit flow through the first flow port 16.

The magnetically-permeable plunger 40 continues to travel toward the first end 84 of the core spool member 82 until it engages the magnetically-nonpermeable spacer member 88. With the through port 49 of the plunger 40 axially aligned with the second flow port 18, the fluid media travels through the valve body 12 in an unobstructed manner. Likewise, with the plunger 40 in the second plunger position so as to be proximate to and slightly spaced from both the first end 84 of the core spool member 82 and the flux-receiving extension portion of the pole piece 70, a magnetic circuit is provided. That is, and as best seen in FIG. 4, the magnetic flux M passes from the core spool member 82 to the plunger 40, and then through the pole piece 70 into the valve body 12, i.e., solenoid housing, and back through the flange 87 of the core spool member 82.

To close the flow control valve of the present invention, the solenoid wire coil is simply de-energized. The magnetic flux M extending from the core spool member 82 ceases, and the plunger 40 returns to the first plunger position due to the bias of the preloaded disk springs 62. It is further noted that the magnetically-nonpermeable spacer member 88 prevents the plunger 40 from being held in the second plunger position against the first end 84 of the core spool member 82, even when residual magnetic flux exists. Likewise, by annealing the magnetically permeable materials, residual magnetism is further reduced and permeability is improved.

The flow control valve of the present invention has proven useful and effective for bipropellant thrust control in space application. This is particularly noteworthy since conventional solenoid flow control valves are typically inadequate in applications which require the use of hard elastomer or plastic sealing materials, as well as when the use of lubricant coatings or plating are generally prohibited.

Similarly, it is anticipated that the demonstrated excellent dynamic stability of the flow control valve of the present invention will prove useful in the pulse width modulation servocontrol field. As opposed to the existing analog servovalves, the flow control valve of the present invention, in combination with a digital control system, can provide proportional control at a significantly reduced level of cost. Hence, this technology is suited for any equipment requiring stable, responsive, repeatable or remote operation at an extremely favorable cost. In particular, it is anticipated that future applications will include aircraft brake systems, fuel control, active suspensions, dynamic ship board propeller shaft stabilization, and any other high reliability, high response fluid control application. The high speed, long life solenoid valve of the present invention offers the advantage of direct digital control, low cost, and moderate filtration with little maintenance required.

It will be apparent to those skilled in the art that various modifications and variations can be made in the design of the flow control valve of the present invention and in construction of the apparatus without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A valve for controlling fluid flow comprising:
a valve body made of a magnetically-permeable material having a chamber defined therein, the valve body including a first flow port and a second flow port, both the first flow port and the second flow port fluidly communicating with the chamber;
a seat member located on the valve body within the chamber, the seat member defining a mouth of the first flow port;
a plunger provided within the chamber, the plunger being made of a magnetically-permeable material and positionable along a longitudinal axis extending through the mouth of the first flow port, such that the plunger is positionable between a first plunger position in sealing engagement with the seat member to prevent flow through the first flow port and a second plunger position spaced from the seat member to permit flow through the first flow port,
wherein the plunger includes a first surface having an extension defined by a side wall and a sealing surface for sealing engagement with the seat member when the plunger is in the first plunger position, a second surface opposite the first surface, and a peripheral side surface extending between the first surface and the second surface, the plunger further having a through port extending therethrough from the second surface of the plunger to the side wall of the extension;
means for supporting the plunger in alignment with the longitudinal axis as the plunger is moved between the first plunger position and the second plunger position, the supporting means connected to and radially extending from the plunger to the valve body;
means for selectively positioning the plunger from the first plunger position to the second plunger position, the positioning means being independent of the supporting means and including
a pole piece made of magnetically-permeable material affixed to the valve body within the chamber proximate to and spaced from the plunger, and
a selectively operable electromagnet having a magnetically-permeable core spool member located along the longitudinal axis adjacent the plunger, wherein selective operation of the selectively-operable electromagnet moves the plunger toward the core spool member to the second plunger position to form a magnetic circuit through the plunger, the pole piece, the valve body, and the core spool member, and further wherein the second flow port of the valve extends longitudinally through the core spool member and is axially aligned with the through port extending through the plunger for unobstructed flow through the second flow port when the plunger is in the second plunger position; and a spacer member of magnetically-nonpermeable material positioned between the plunger and the selectively-operable electromagnet to preclude direct contact therebetween as the plunger moves toward the core spool member.

2. The valve of claim 1, wherein the pole piece substantially surrounds the peripheral side surface of the plunger.

3. The valve of claim 1, wherein the supporting means includes a first disk spring radially extending from the plunger to the valve body adjacent at least a portion of the pole piece, the first disk spring being preloaded to bias the plunger toward the seat member to the first plunger position when the selectively-operable electromagnet is inoperative.

4. The valve of claim 3, wherein the supporting means includes a second disk spring radially extending from the plunger to the valve body, the second disk spring being spaced from the first disk spring with said at least a portion of the pole piece located between the first disk spring and the second disk spring.

5. The valve of claim 4, wherein the pole piece includes a base portion for affixing the pole piece to the valve body and a flux-receiving portion extending radially toward the plunger, and further wherein the first disk spring and the second disk spring are attached to the base portion with the flux-receiving portion positioned therebetween.

6. The valve of claim 1, wherein the supporting means includes at least two disk springs radially extending from the plunger to the valve body, one of the two disk springs being attached to the plunger proximate the first surface and the other of the two disk springs being attached to the plunger proximate the second surface.

7. The valve of claim 6, wherein the two disk springs are preloaded to bias the plunger toward the seat member to the first plunger position; and further wherein the pole piece includes a base portion for affixing the pole piece to the valve body and a flux-receiving portion positioned between the two disk spring.

8. The valve of claim 1, wherein the sealing surface of the extension includes a retaining cavity for holding a seal member insert, the seal member insert being positioned for sealing engagement with the seat member when the plunger is moved to the first plunger position.

9. A solenoid valve for controlling fluid flow comprising:

a valve body made of magnetically-permeable material and having a chamber defined therein, the valve body including a first flow port and a second flow port, both the first flow port and the second flow port fluidly communicating with the chamber;

a seat member located on the valve body within the chamber, the seat member defining a mouth of the first flow port;

a plunger provided within the chamber, the plunger being made of magnetically-permeable material and positionable along a longitudinal axis extending through the mouth of the first flow port, such that the plunger is positionable between a first plunger position in sealing engagement with the seat member to prevent flow through the first flow port and a second plunger position spaced from the seat member to permit flow through the first flow port, wherein the plunger includes a first surface having an extension defined by a side wall and a sealing surface for sealing engagement with the seat member when the plunger is in the first plunger position, a second surface opposite the first surface, and a peripheral side surface extending between the first surface and the second surface, the plunger further having a through port extending therethrough from the second surface of the plunger to the side wall of the extension;

a spring assembly connected to and radially extending from the plunger to the valve body for supporting the plunger in alignment with the longitudinal axis as the plunger is moved between the first plunger position and the second plunger position;

a pole piece made of magnetically-permeable material attached to the valve body within the chamber proximate to and spaced from the plunger, at least a portion of the pole piece being positioned adjacent the spring assembly;

a selectively-operable electromagnet having a magnetically-permeable core spool member located along the longitudinal axis adjacent the plunger, wherein selective operation of the selectively-operable electromagnet moves the plunger toward the selectively-operable electromagnet to the second plunger position to form a magnetic circuit through the plunger, the pole piece, the valve body and the core spool member, and further wherein the second flow port of the valve extends longitudinally through the core spool member and is axially aligned with the through port extending through the plunger for unobstructed flow through the second flow port when the plunger is in the second plunger position; and a spacer member of magnetically-nonpermeable material positioned between the plunger and the selectively-operable electromagnet to preclude direct contact therebetween as the plunger moves toward the core spool member.

10. The solenoid valve of claim 9, wherein the spring assembly includes at least two disk springs radially extending from the plunger to the valve body, one of the two disk springs being attached to the plunger proximate the first surface and the other of the two disk springs being attached to the plunger proximate the second surface with at least a portion of the pole piece positioned therebetween.

11. The valve of claim 6, wherein at least one of the two disk springs includes an outer peripheral member, an inner cuff member, and a plurality of S-shaped resilient members extending therebetween.

12. The solenoid valve of claim 10, wherein at least one of the two disk springs includes an outer peripheral member, an inner cuff member, and a plurality of S-shaped resilient members extending therebetween.

* * * * *